United States Patent [19]

Wenstadt et al.

[11] Patent Number: 5,443,026
[45] Date of Patent: Aug. 22, 1995

[54] BOAT HULL WITH AFT PLANING MEMBERS

[75] Inventors: Thomas D. Wenstadt, Cadillac, Mich.; Clarence E. Blanchard, Kenosha, Wis.; Charles L. Granie, Columbia, S.C.

[73] Assignee: Outboard Marine Corporation

[21] Appl. No.: 62,980

[22] Filed: May 14, 1993

Related U.S. Application Data

[63] Continuation-in-part of Ser. No. 824,250, Jan. 21, 1992, abandoned, which is a continuation-in-part of Ser. No. 699,806, May 7, 1991, Pat. No. D. 335,276.

[51] Int. Cl.⁶ .................................................. B63B 1/00
[52] U.S. Cl. ................................... 114/56; 114/288; D12/314
[58] Field of Search .................. 114/271, 274, 288, 291, 114/56, 61; D12/314, 313, 312, 310

[56] References Cited

U.S. PATENT DOCUMENTS

| D. 245,902 | 9/1977 | Rogers | D12/62 |
|---|---|---|---|
| D. 318,450 | 7/1991 | Lathers | D12/314 |
| D. 320,377 | 10/1991 | Livingston et al. | D12/314 |
| D. 324,022 | 2/1992 | Hart et al. | D12/314 |
| D. 329,038 | 9/1992 | Dekker et al. | D12/314 |
| D. 333,810 | 3/1993 | Wenstadt | D12/314 |
| D. 335,276 | 5/1993 | Wenstadt | D12/314 |
| 1,784,071 | 2/1929 | Norman | 114/291 |
| 3,648,640 | 3/1972 | Granger | 114/66.5 |
| 3,763,810 | 10/1973 | Payne | 114/285 |
| 4,004,534 | 1/1977 | Allison | 114/274 |
| 4,027,613 | 6/1977 | Wollard | 114/291 |
| 4,233,920 | 11/1980 | Wood et al. | 114/56 |
| 4,348,972 | 9/1982 | Parsons | 114/61 |
| 4,361,102 | 11/1982 | Wood et al. | 114/56 |
| 4,492,176 | 1/1985 | Arima | 114/56 |
| 4,528,927 | 7/1985 | Iizuka et al. | 114/125 |
| 4,584,959 | 4/1986 | Allison | 114/288 |
| 4,903,626 | 2/1990 | Haines | 114/56 |
| 4,924,797 | 5/1990 | Solia | 114/288 |
| 5,063,868 | 11/1991 | Fink, Jr. | 114/56 |
| 5,224,436 | 7/1993 | Stricker | 114/271 |

Primary Examiner—Robert J. Oberleitner
Assistant Examiner—Clifford T. Bartz
Attorney, Agent, or Firm—Michael, Best & Friedrich

[57] ABSTRACT

A hull for a boat comprising a main hull bottom having a pair of hull bottom sides, each side having a first longitudinal inner edge and a second outer edge, with the hull bottom sides connected along the first inner edges and extending transversely upwardly and outwardly therefrom in a generally "V" shaped transverse cross section, each of the hull bottom sides having a main portion angled outwardly and upwardly from the first inner edge, and each of the hull bottom sides having a chine angled outwardly and downwardly from the main portion along a majority of the length of the second edge, a substantially vertical transom at the aft ends of the hull bottom sides, and a pair of raised after planing surfaces having forward ends at the transom and projecting aft of the transom and substantially parallel to and stepped slightly above the hull bottom sides immediately in front of the after planing surfaces, and the raised after planing surfaces also projecting aft generally parallel to and slightly above the chines, such that each of the after planing surfaces includes an inner portion angled outwardly and upwardly aft of the immediately forwardly located hull bottom side main portion, and an outer portion slanted outwardly and downwardly aft of the immediately forwardly located chine.

42 Claims, 13 Drawing Sheets

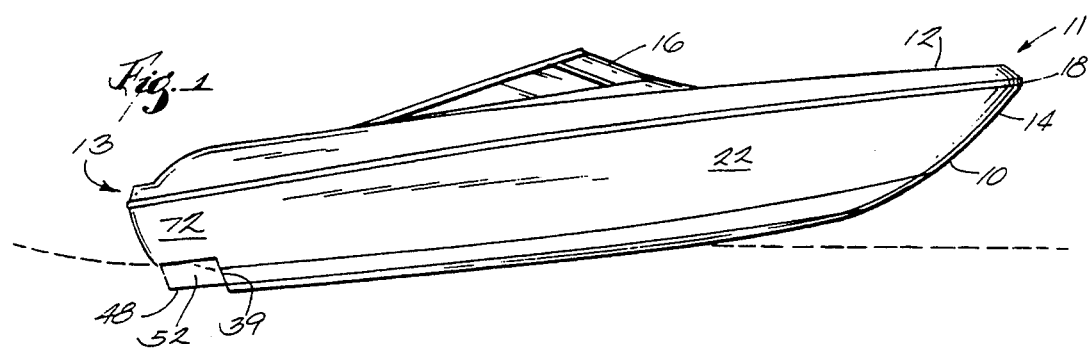
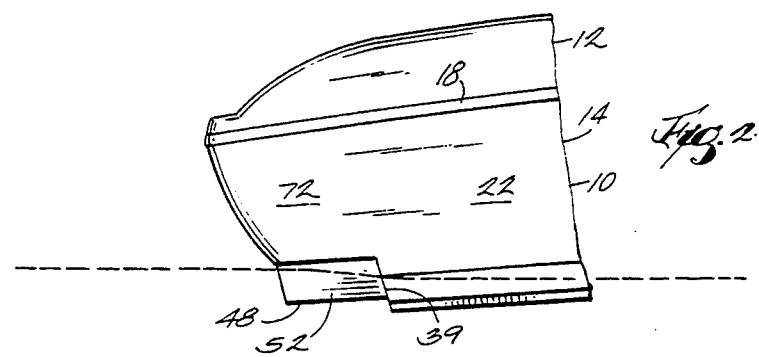
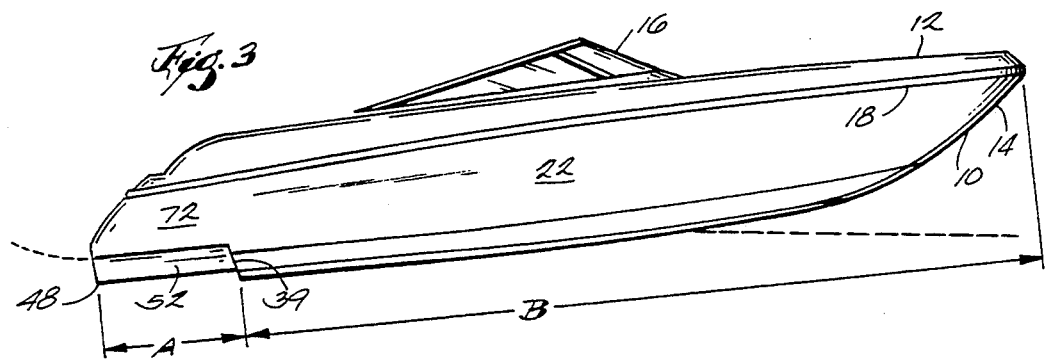
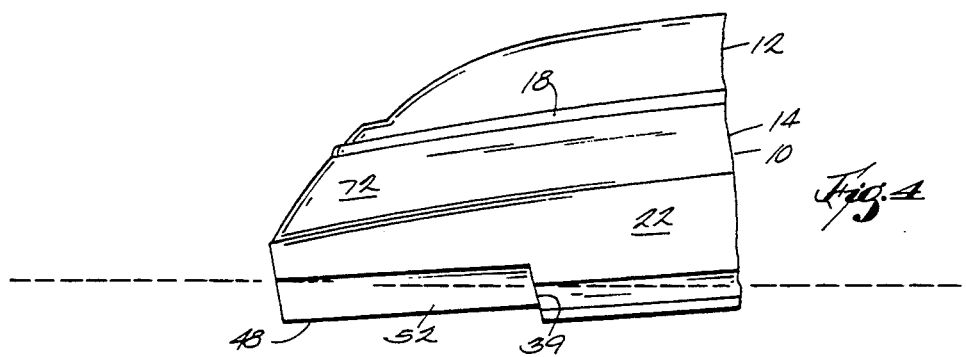
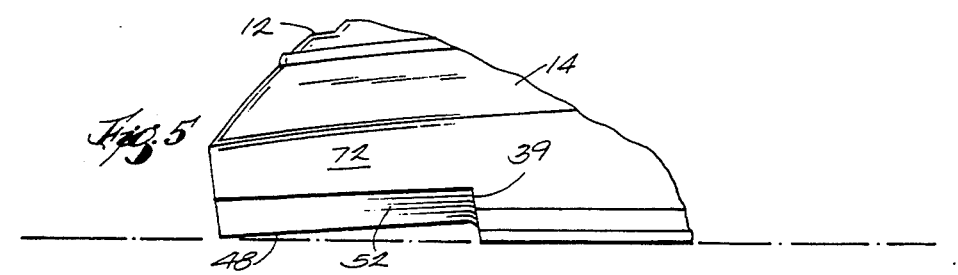

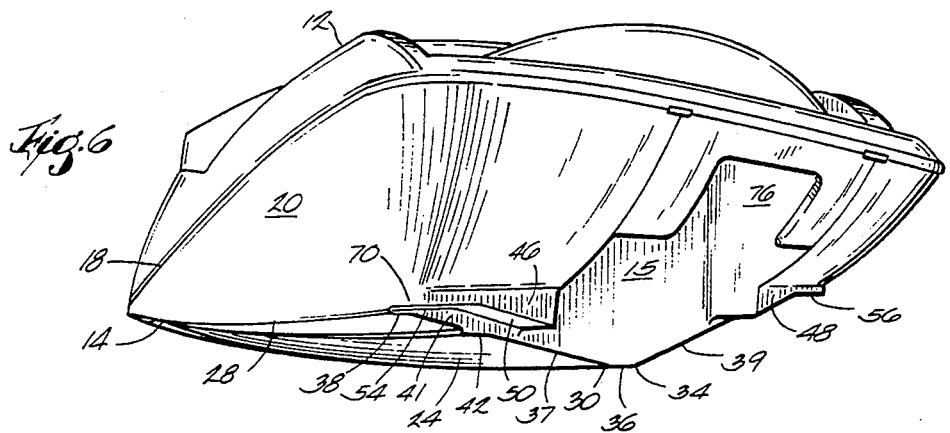
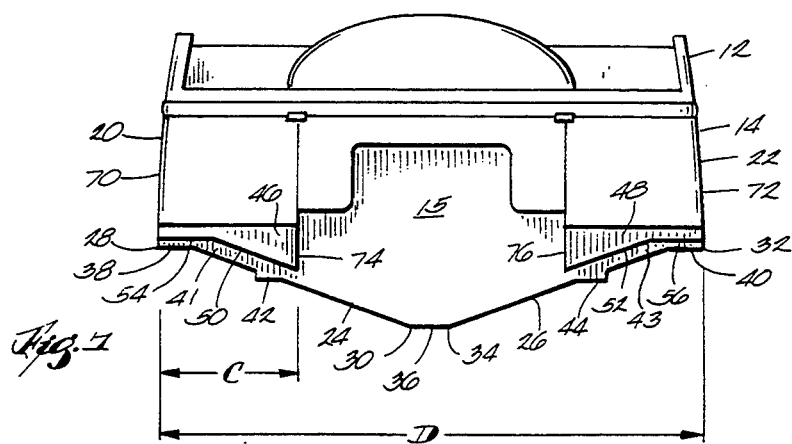
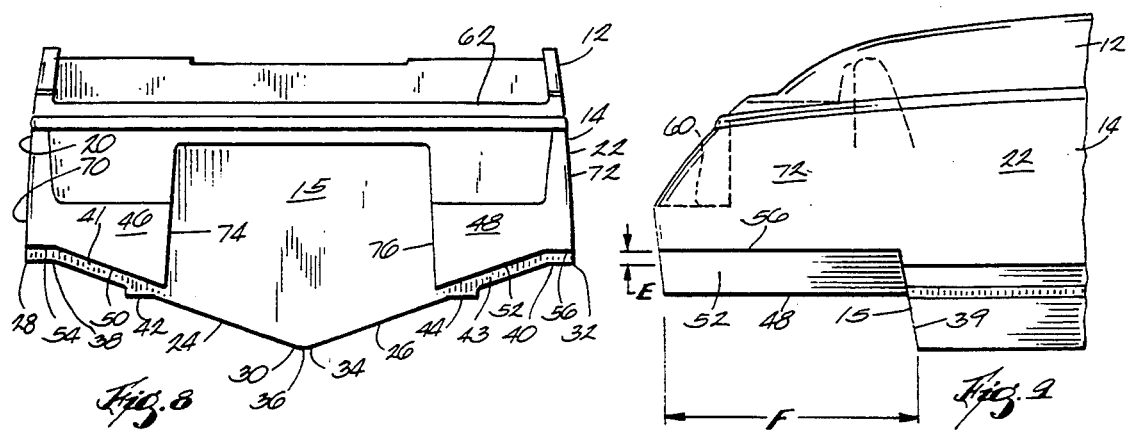

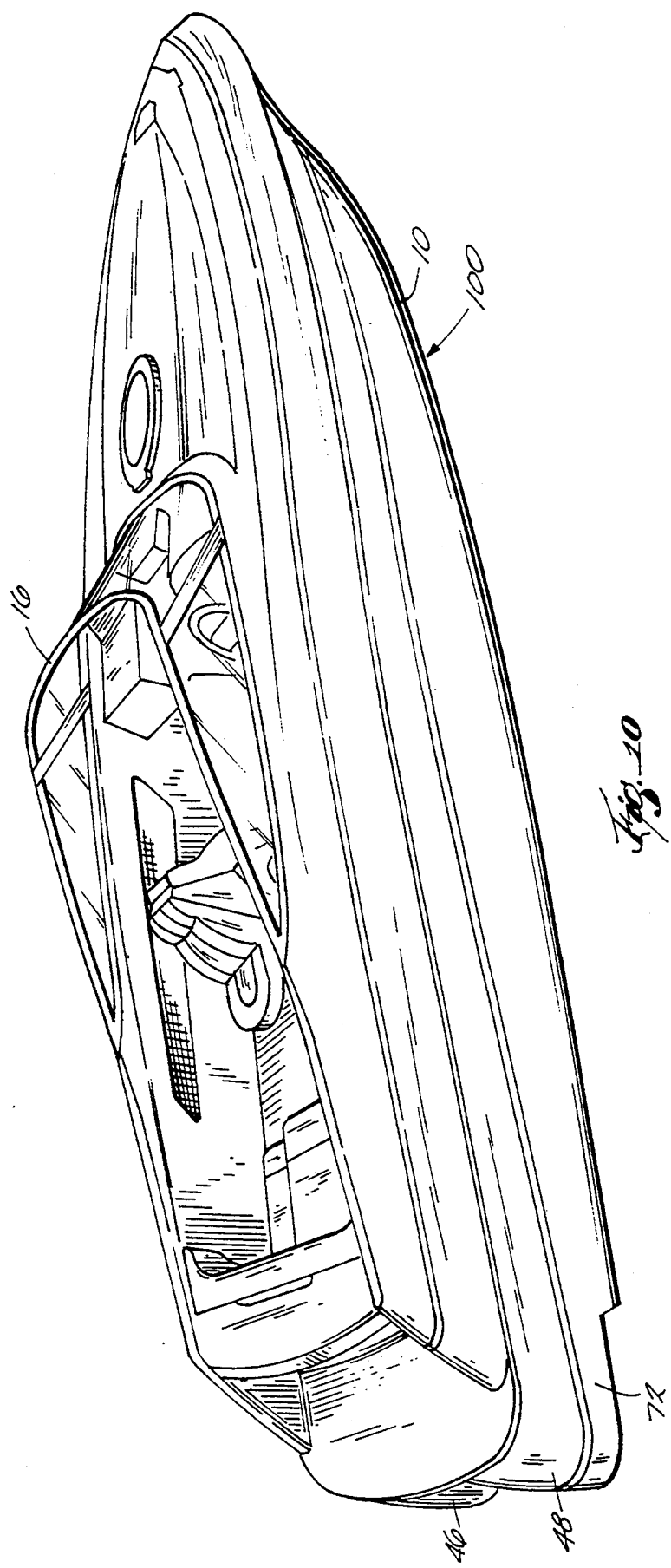

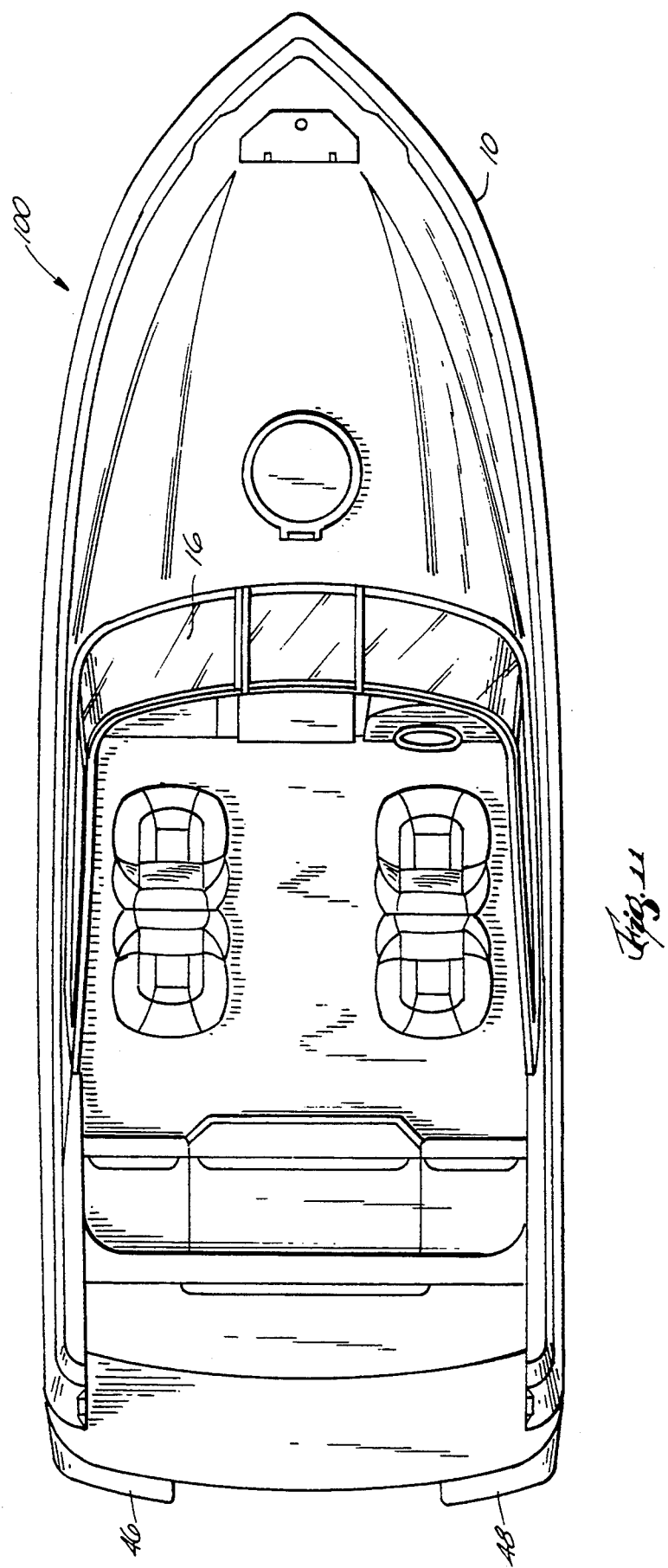

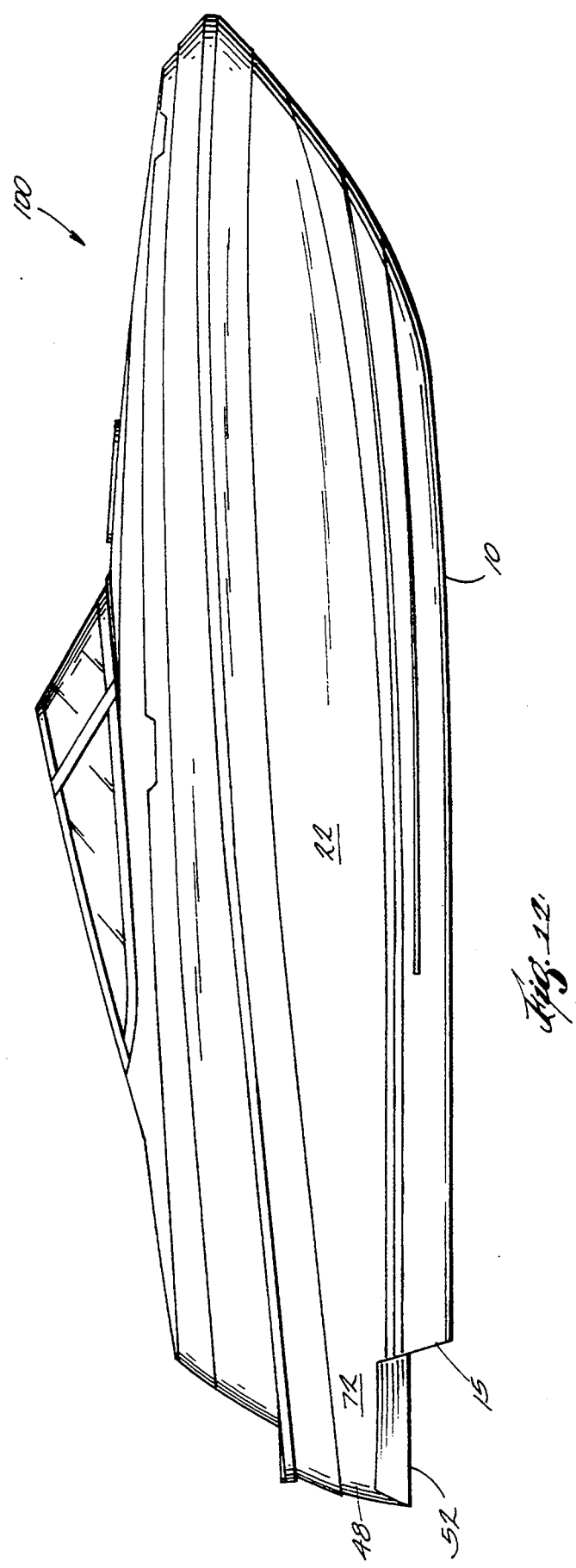

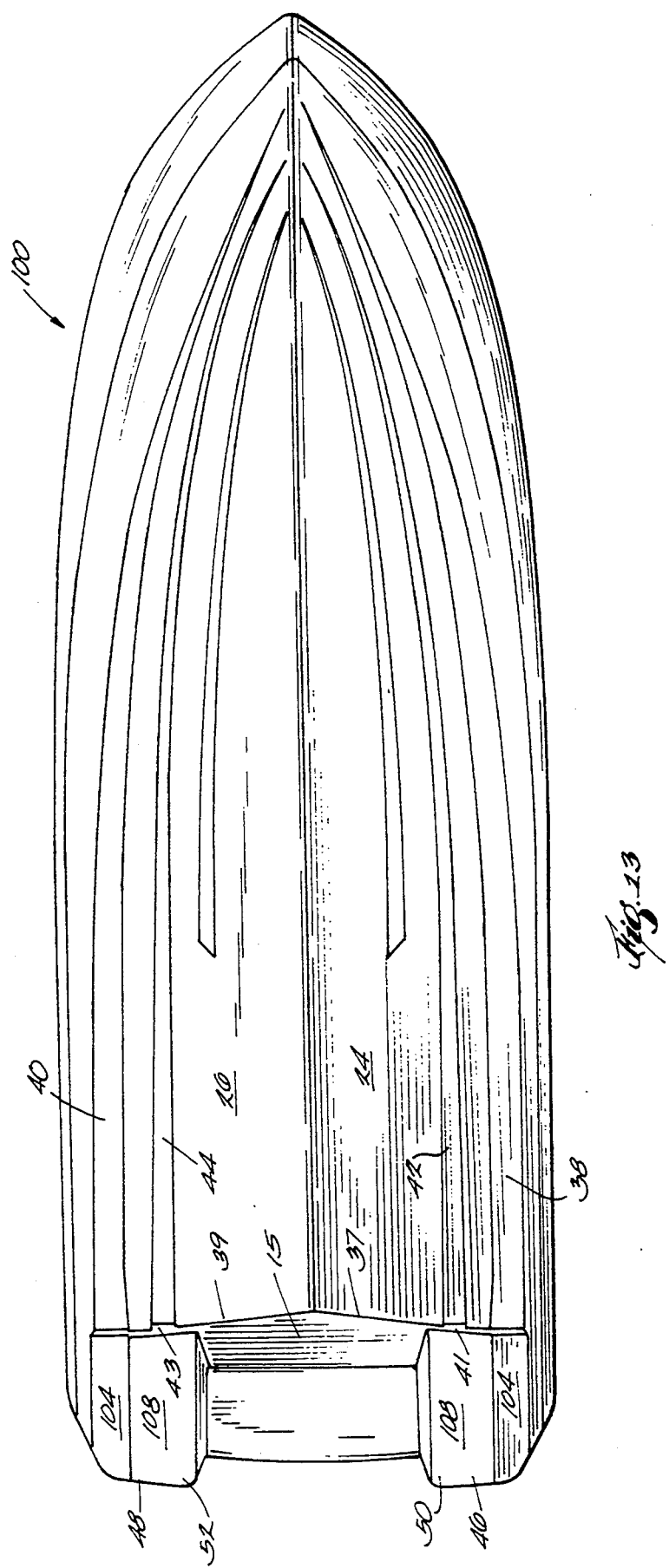

BOAT HULL WITH AFT PLANING MEMBERS

RELATED APPLICATION

This is a continuation-in-part of Ser. No. 07/824,250, filed Jan. 21, 1992 and titled "BOAT HULL WITH APT PLANING MEMBERS now abandoned which, in turn is a continuation-in-part of application Ser. No. 07/699,806, filed May 7, 1991 and titled "Recreation Boat", now issued as U.S. Pat. No. Des. 335,276 on May 4, 1993.

BACKGROUND OF THE INVENTION

The invention relates to a boat hull having an aft portion which aids in allowing the boat to get on plane.

In a conventional "V" type hull, the bottom of the boat terminates at the transom. In boats of this nature, either an outboard motor can be set on the transom or a stern drive, which has a motor within the boat directly in front of the transom and with a propulsion leg sticking through the transom, can be used to power the boat. In these types of boats, the driving force or propeller is behind and below the rear most portion of the boat.

In other hull constructions, such as that shown in U.S. Pat. No. 4,361,102, the bottom of the central portions of the hull actually terminates forward of the transom so that there is a step between the bottom of the hull and the transom.

When boats of either of the above general type go from a rest or idle condition to a full speed planing condition, they must accelerate through a condition which is known as "getting on plane". When these boats are getting on plane, the angle of the boat in the water can be quite steep, which can hinder the visibility of the operator, as well as creating an inefficient running condition.

Depending on the weight of the boat, the position of the load in the boat, and the amount of power of the engine, the condition of getting on plane can last an extended length of time. Once on plane, the angle of attack of the boat with respect to the water will level off and visibility is restored to the operator.

In order to enhance the speed in which boats of the above type get on plane, it is known in the art to attach a pair of trim tabs to the transom of the boat. These trim tabs are generally made of metal and extend rearwardly from and pivot about an axis parallel to the bottom of the boat at the junction of the bottom of the boat and the transom. These trim tabs can be pivoted about this axis by means of a hydraulic cylinder having one end attached to their rearward edge and the other to the transom. As can be appreciated, these trim tabs stay in the water during all running conditions and create additional wetted surface area for the boat even after the boat has gotten onto plane which will tend to slow the boat's progress through the water once on plane.

U.S. Pat. No. 4,492,176 discloses a boat hull having outboard portions of the bottom of the hull which extend rearwardly of the transom. These portions are at the same level as the hull and thus are in the water and creating drag at all times, similar to the above described trim tabs.

U.S. Pat. No. 4,584,959 discloses a boat hull having after-sponsons which extend rearwardly from the transom of the boat along either side of the motor well. These sponsons have lower surfaces 46 which allegedly cause the boat to plane more quickly. However, the length and shapes of these surfaces are not clearly defined in this patent, but, as seen in at least FIG. 3 of the patent, they are not parallel to the bottom of the boat hull nor are they of constant width throughout their length. To the contrary, the overall shape of the sponson is described as aerodynamically streamlined in order to aid in the ability of the speed boat in this patent to move through the air. This requirement would teach away from the sponsons being parallel to the bottom of the main hull or having the same cross sections as the main hull throughout their length, as this is not an aerodynamically efficient shape.

SUMMARY OF THE INVENTION

The invention provides a hull for a boat comprising a main hull bottom having a pair of hull bottom sides, each side having a first longitudinal inner edge and a second outer edge, the hull bottom sides being connected along the first inner edges and extending transversely upwardly and outwardly therefrom in a generally "V" shaped transverse cross section, a substantially vertical transom at the aft ends of the hull bottoms, and a pair of raised after planing surfaces projecting aft of the transom and substantially parallel to and stepped slightly above the hull bottom sides.

In one embodiment, the hull bottom sides have substantially horizontal chines along a majority of the length of the second outer edges, and the raised after planing surfaces also extend parallel to and slightly above the chines.

In another embodiment, each of the bottom sides has a lifting strake extending longitudinally intermediate the first and second edges and the raised after planing surfaces also extend aft from and slightly above the strakes.

In one embodiment, the main hull bottom and each of the after planing surfaces have lengths and the ratio of the length of the main hull bottom to the length of one of the planing surfaces is between 7:1 and 16:1.

In one embodiment, the main hull bottom has a width at the transom and each of the raised after planing surfaces has a width immediately behind the transom and the ratio of the width of the hull bottom section at the transom to the width of one of the planing surfaces immediately behind the transom less than 7:1.

In one embodiment, each of the raised after planing surfaces has a length and the step from the main hull bottom to the raised after planing surfaces has a height and the ratio of the length of the after planing surfaces to the height of the step is between 20:1 and 50:1.

The invention also provides a hull for a boat comprising a main hull bottom having a pair of hull bottom sides, each side having a first longitudinal inner edge and a second outer edge, the hull bottom sides being connected along the first inner edges and extending transversely upwardly and outwardly therefrom in a generally "V" shaped transverse cross section, a substantially vertical transom at the aft ends of the hull bottoms, and a pair of raised after planing surfaces projecting aft of the transom with the after planing surfaces having a width and a length, with the width of the after planing surfaces being substantially constant throughout the length.

The invention also provides a hull for a boat having a stern and a bow comprising a main hull bottom having a series of generally "V" shaped transverse cross sections with the outboard portions of the main hull bottom sections comprising a pair of substantially horizontal chines, the main hull bottom having a width at the stern of the boat, a substantially vertical transom extending transversely at the stern, the transom having a width, with the width of the transom being less than the width of the hull bottom, and a pair of after planing members projecting rearwardly of and outboard of the transom, the after planing members having bottom portions which are in vertically, upwardly stepped relation to the main hull bottom and have substantially the same transverse cross section as the main hull bottom at the transom immediately in front of the bottom portions.

In one embodiment, the cross sections of the main hull have increasingly steep angles from the horizontal as they progress from the stern to the bow.

In one embodiment, the chines have a width at each cross section and the width of the chines decreases from the stern to the bow.

In one embodiment, the bottom portions of the planing members project rearwardly in a plane parallel to and above the plane of the main hull bottom section.

In one embodiment, the bottom portions of the after planing members project rearwardly and downwardly from a point immediately behind the transom and above the hull bottom section.

In one embodiment, the bottom portions of the after planing members also comprise an adjustable trim tab at the distal end thereof.

The invention also provides a hull for a boat comprising a longitudinal axis, a main hull bottom having a series of generally "V" shaped transverse cross sections, a substantially vertical transom including a central portion which extends generally perpendicular to the axis and which has port and starboard sides, a port outer portion extending forwardly and outwardly from the port side of the central portion, and a starboard outer portion extending forwardly and outwardly from the starboard side of the central portion, and a pair of after planing members projecting rearwardly of the outer portions of the transom, such that the after planing members have bottom surfaces which are in vertically upwardly stepped relation to the main hull bottom immediately in front of the bottom surfaces.

The invention also provides a hull for a boat comprising a main hull bottom having a pair of hull bottom sides, each side having a first longitudinal inner edge and a second outer edge, with the hull bottom sides connected along the first inner edges and extending transversely upwardly and outwardly therefrom in a generally "V" shaped transverse cross section, each of the hull bottom sides having a main portion angled outwardly and upwardly from the first inner edge, and each of the hull bottom sides having a chine angled outwardly and downwardly from the main portion along a majority of the length of the second edge, a substantially vertical transom at the aft ends of the hull bottom sides, and a pair of raised after planing surfaces having forward ends at the transom and projecting aft of the transom and substantially parallel to and stepped slightly above the hull bottom sides immediately in front of the after planing surfaces, and the raised after planing surfaces also projecting aft generally parallel to and slightly above the chines, such that each of the after planing surfaces includes an inner portion angled outwardly and upwardly aft of the immediately forwardly located hull bottom side main portion, and an outer portion slanted outwardly and downwardly aft of the immediately forwardly located chine.

The invention also provides a hull for a boat comprising a main hull bottom having a pair of hull bottom sides, each side having a first longitudinal inner edge and a second outer edge, with the hull bottom sides connected along the first inner edges and extending transversely upwardly and outwardly therefrom in a generally "V" shaped transverse cross section, a substantially vertical transom at the aft ends of the hull bottom sides, and a pair of raised after planing surfaces projecting aft of the transom, each of the after planing surfaces curving rearwardly and downwardly from the transom.

A principal feature of the invention is the provision of a boat hull having a pair of members aft of the transom along the outboard edges of the hull. The members have cross sections that are parallel to the transverse cross section of the hull at the transom and which aid in the ability of the boat to get on plane. Once the boat is on plane, these members are lifted from the water and thus do not increase the drag of the boat in the water after the boat is planing.

Additionally, these members may be filled with a flotation material which aids in the swamped flotation of the boat. Moreover, these members may have one or more steps in their top sides for boarding the boat from the water.

Other principal features and advantages of the invention will become apparent to those skilled in the art upon review of the following detailed description, claims and drawings.

DESCRIPTION OF THE DRAWINGS

FIG. 1 is a side elevational view of a boat that is a first embodiment of the invention and that is attempting to get on plane.

FIG. 2 is a detail of the aft portion of FIG. 1 after the boat has gotten on plane.

FIG. 3 is a side elevational view of a boat that is a second embodiment of the invention and that is attempting to get on plane.

FIG. 4 is a detail of the aft portion of FIG. 3 after the boat has gotten on plane.

FIG. 5 is a detail of the aft end of a boat that is a third embodiment of the invention.

FIG. 6 is a rear perspective of a boat that is a first embodiment of the invention.

FIG. 7 is a rear elevation of a boat that is the first embodiment of the invention.

FIG. 8 is a rear elevation of a boat that is a second embodiment of the invention.

FIG. 9 is a detail side elevation of the aft portion of the boat that is the second embodiment of the invention with portions of the transom and other construction in dotted lines.

FIG. 10 is a perspective view of a boat that is a fourth embodiment of the invention.

FIG. 11 is a top plan view of the boat shown in FIG. 10.

FIG. 12 is a right side elevational view of the boat shown in FIG. 10.

FIG. 13 is a bottom plan view of the boat shown in FIG. 10.

Figure 14:
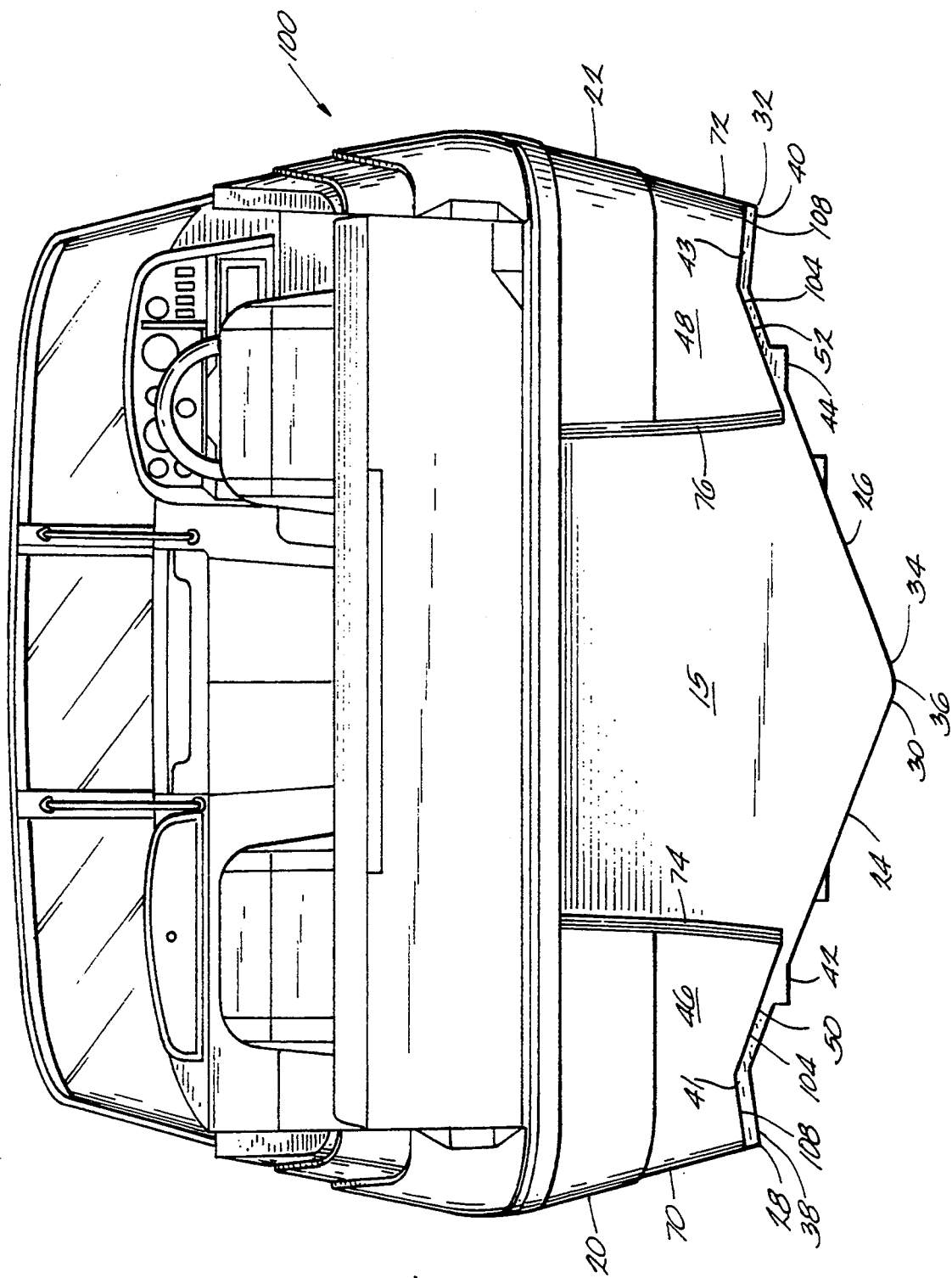
FIG. 14 is a rear elevational view of the boat shown in FIG. 10.
Figure 15:
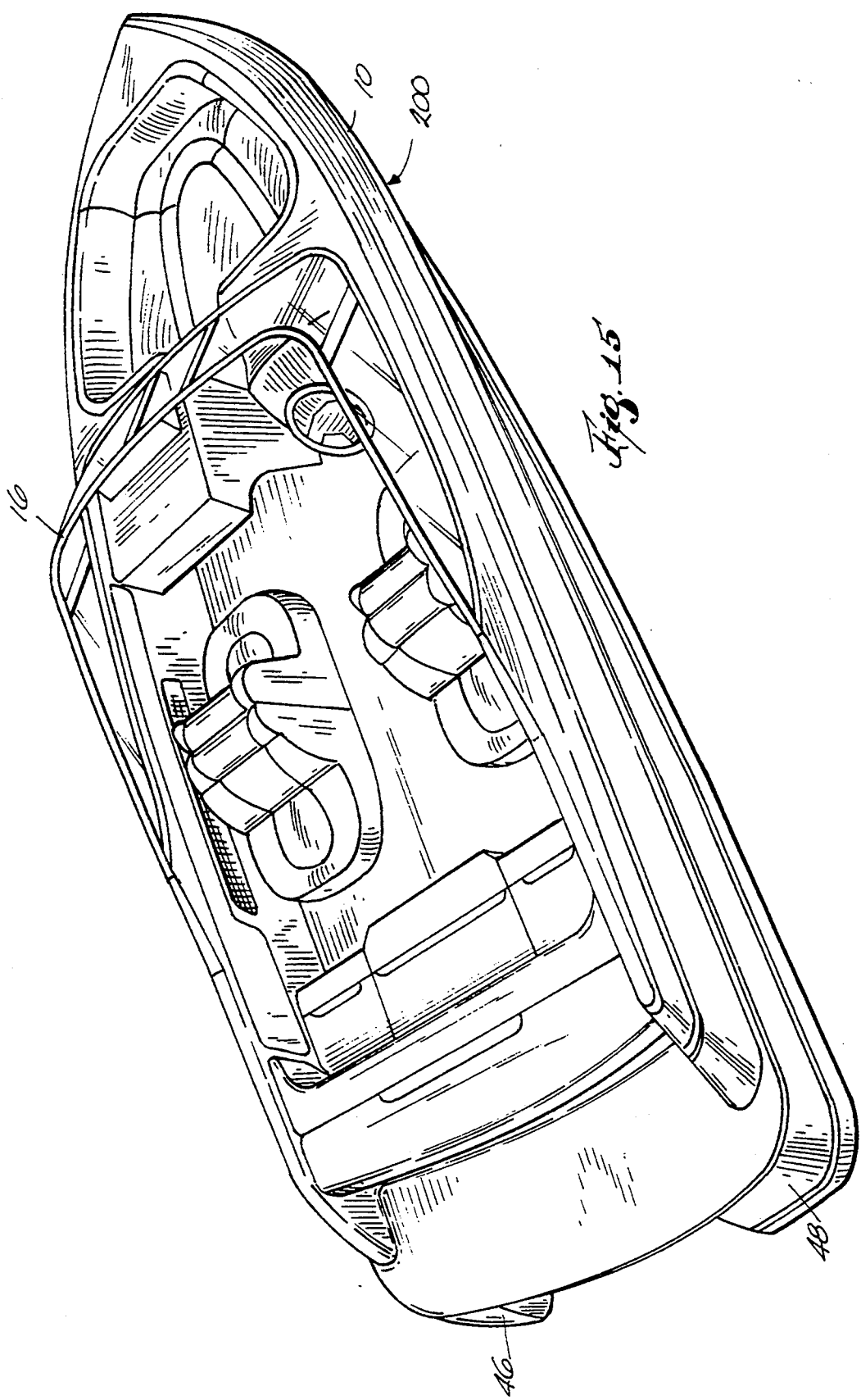
FIG. 15 is a perspective view of a boat that is a fifth embodiment of the invention.
Figure 16:
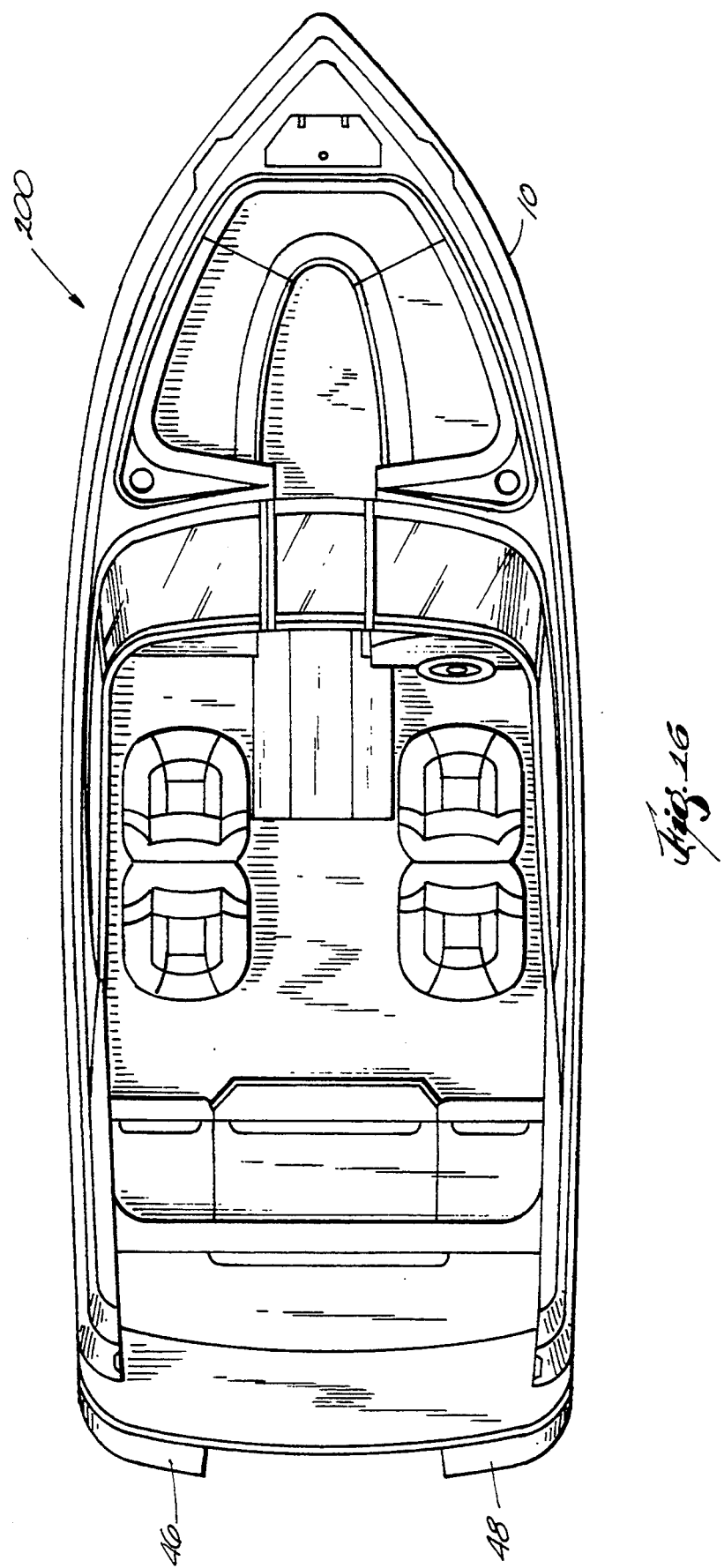
FIG. 16 is a top plan view of the boat shown in FIG. 15.
Figure 17:
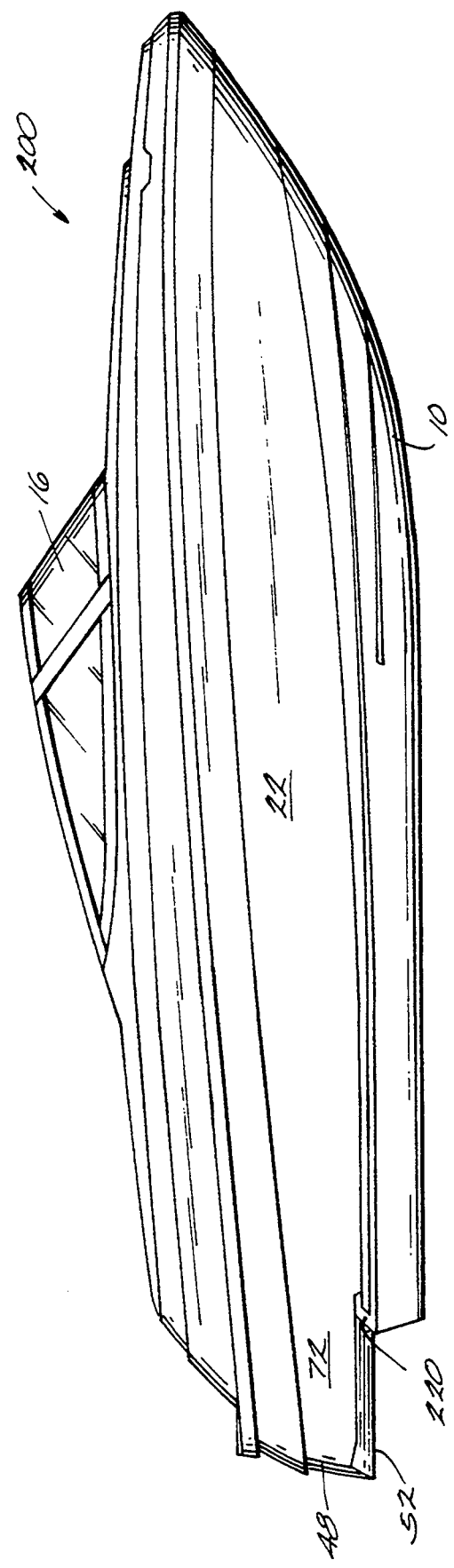
FIG. 17 is a right side elevational view of the boat shown in FIG. 15.
Figure 18:
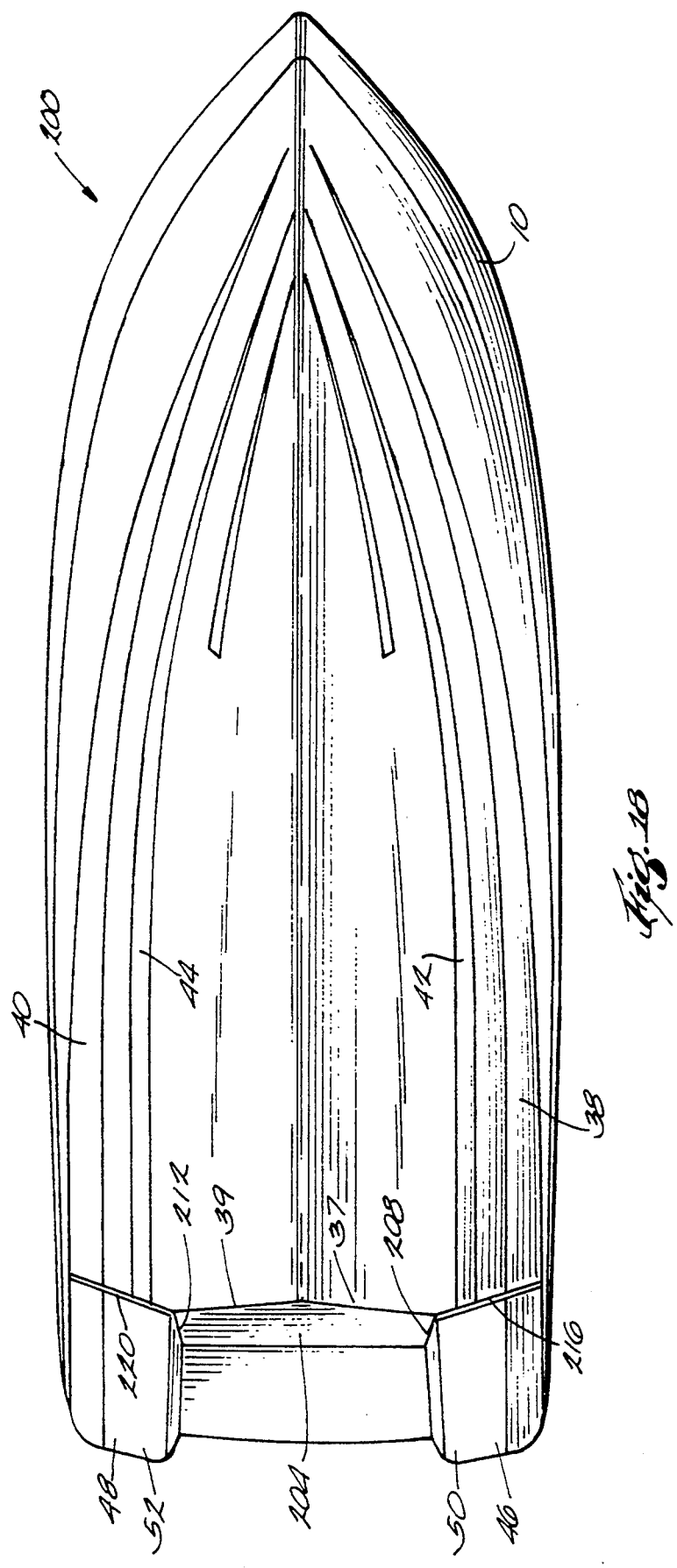
FIG. 18 is a bottom plan view of the boat shown in FIG. 15.
Figure 19:
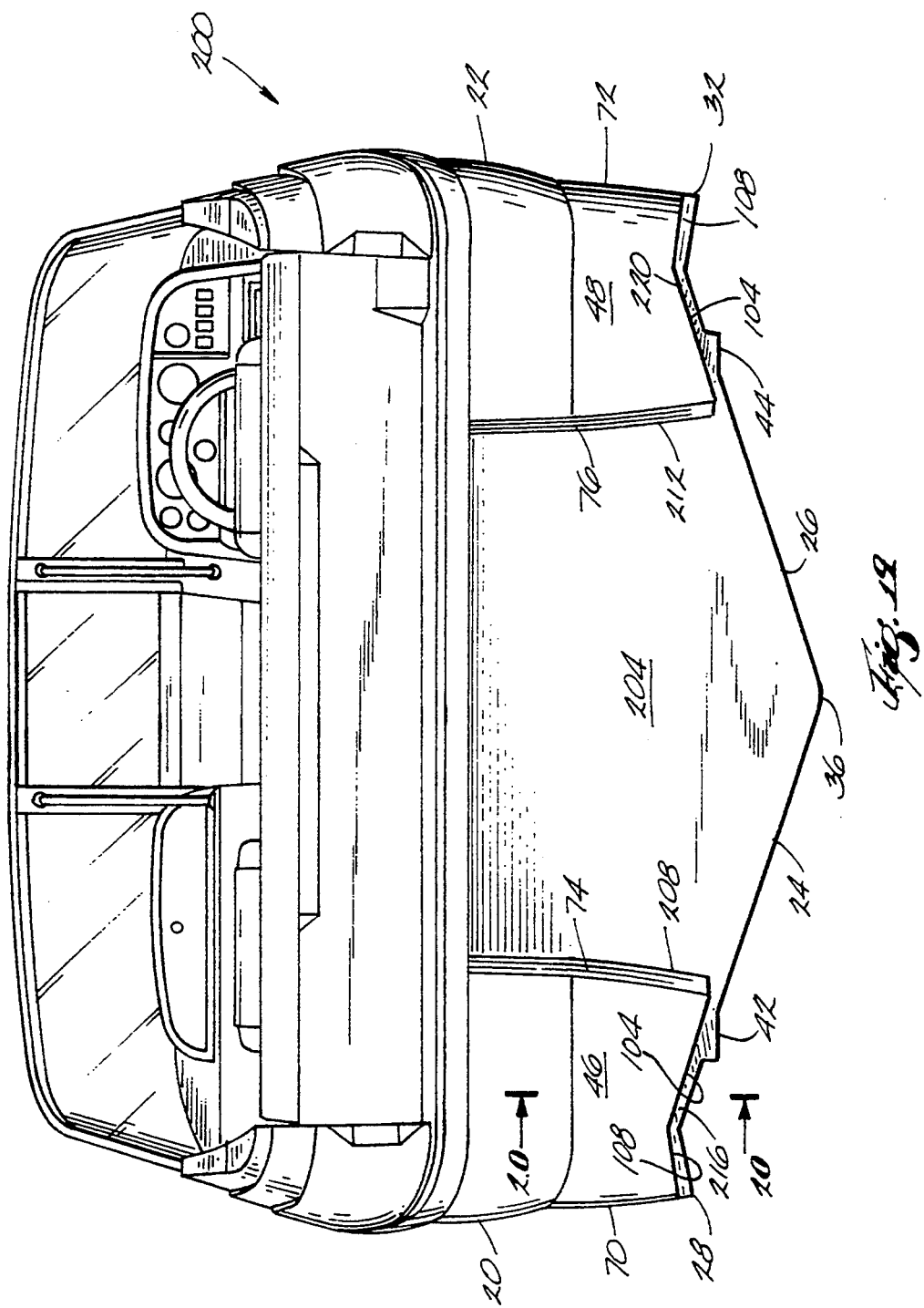
FIG. 19 is a rear elevational view of the boat shown in FIG. 15.

Before one embodiment of the invention is explained in detail, it is to be understood that the invention is not limited in its application to the details of the construction and the arrangement of components as set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

The invention generally relates to a new and novel construction of a recreational fiberglass boat. As with other prior art fiberglass boats, the boat has a bow 11 and a stern or aft area 13, and comprises a hull 10 which, in the embodiments shown, actually comprises a deck portion 12 and a hull portion 14. Both the deck portion 12 and the hull portion 14 are preferably made of fiberglass, and as is known in the art, the deck portion 12 and the hull portion 14 are bonded together along the gunnel 18 by means of screws, bolts, glue, or other known means. The gunnel 18 generally runs around the entire periphery of the boat. Upon the deck is a windshield 16 which protects the operator of the boat. In the stern area 13 is a generally vertical transom 15 (FIGS. 6 and 7).

The aft or stern area 13 of the boat is adapted to contain a propulsion means (not shown). Specifically, the boat depicted in FIGS. 1, 2, 6 and 7 is adapted for a propulsion means sold under the trademark "QUIETRIDER" by Outboard Marine Corporation. The boat shown in the other figures is specifically adapted to contain a stern drive propulsion means having a powerhead in front of the transom 15 and inside the boat and a drive leg extending through the transom. Although a boat specifically adapted for an outboard propulsion means is not shown in the figures, it can be appreciated that an outboard, which has a powerhead and drive unit attached directly to the transom, could easily be used in conjunction with a boat hull having this invention. In any event, the boat of the invention is adapted so that the propeller of the propulsion means is immediately behind and below the transom 15.

As can be seen more clearly in FIGS. 6 and 7, the hull portion 14 of the boat comprises a pair of port and starboard hull topsides 20 and 22 which, at the stern, extend generally vertically downwardly from the gunnel 18 on either side of the boat. Extending inwardly from the bottoms of the topsides are port and starboard hull bottoms 24 and 26. The port hull bottom 24 has an outer edge 28 and an inner edge 30. In similar fashion, the starboard hull bottom 26 also has an outer edge 32 and an inner edge 34. The inner edges 30 and 34 of the port and starboard hull bottoms are connected along the centerline or keel 36 of the boat. In the embodiments shown, the keel is either a line contact between the two hull bottoms or it can have a width, especially in the aft portion, as seen in FIGS. 6 and 7.

The main hull bottoms terminate at aft ends 37 and 39 at the transom 15 which is generally vertical and is also made of fiberglass. In some embodiments, especially those shown in FIGS. 3, 4, 8 and 9, the transom is also reinforced by plywood in order to hold the stern drive propulsion unit (not shown). In other embodiments, such as those shown in FIGS. 1, 2, 6 and 7, the transom is merely fiberglass since it does not need to withstand the stresses of a stern drive. Moreover, the width of the actual transom may vary in different embodiments of boats having this invention. In a conventional boat, the transom would extend from one topside to the other and fill in the entire stern. As can be appreciated by reviewing the drawings, the transom 15 of a boat with the invention is only visible from the outside of the boat in the center portion of the stern except for small lower portions 41 and 43 below after planing members 46 and 48. The transom may actually extend out to the topsides in front of and covered by the port and starboard after planing members 46 and 48. In other embodiments, the lower portions 41 and 43 may actually be upturned portions of the hull bottom at the transom and below the after planing members 46 and 48.

As can clearly be seen in FIGS. 7 and 8, the hull bottoms 24 and 26 generally make a "V" shape when seen in transverse cross section at the transom. As is typical in recreational fiberglass boats, these "V" shaped transverse sections also occur throughout the boat from the stern to its bow. Moreover, in a least some embodiments, the steepness of the "V" from the horizontal increases as cross sections are taken from the stern 13 to the bow 11 of the boat.

In a preferred embodiment, extending for a short distance inwardly from the outer edges 28 and 32 of the port and starboard hull bottoms 24 and 26 are port and starboard chines 38 and 40. These chines generally extend along the entire length of the hull bottoms, and meet near the bow of the boat. In one embodiment, the chines were widest at the stern and generally become narrower as they progress from the stern 13 to the bow 11 of the boat.

Intermediate the outer and inner edges of the hull bottoms are port 42 and starboard 44 lifting strakes. Each lifting strake comprises a horizontal portion and a vertical portion to create a strake which sticks outwardly from the respective hull bottom to give the boat stability and additional lift.

The invention provides a pair of raised after planing members 46 and 48 extending aft of the transom the after planing members also being laterally spaced from each other by a portion of the transom. Each of the after planing members comprises a bottom portion or bottom surface 50 and 52 which, immediately abaft of the transom, is stepped slightly above the respective hull bottom side 24 or 26 along the outer portion of the hull bottom side. In some embodiments, at least some portions of each of the bottom surfaces 50 and 52 lie in planes that are parallel to the plane containing the port and starboard hull bottoms just in front of the transom.

The port and starboard after planing members 46 and 48 also comprise outboard sides 70 and 72 which are extensions of the topsides 20 and 22 for most of the height of the topsides 20 and 22 at the stern. However, as seen in FIGS. 1–5 and 9, the bottom of the side 72 of the starboard after planing member 48 is raised above the bottom of the starboard topsides 22. This is also true of the port side.

The after planing members 46 and 48 also have inboard surfaces 74 and 76 which are generally vertical and extend aft of the outboard edges of the upper portion of the transom. As seen in FIGS. 7 and 8, in one embodiment, the width of the after planing members remains substantially constant throughout their length. In addition, the width of the bottom surfaces 50 and 52 of the after planing members can be substantially constant throughout their length.

Moreover, in at least one embodiment, the after planing members also contain bottom surfaces 54 and 56 which are parallel to and slightly raised above the chines 38 and 40 found at the outer ends of the hull bottoms 24 and 26. In one embodiment, as seen in FIG. 7, the lower surfaces 54 and 56 of the after planing members above the chines may have a width that is wider than the width of the chine immediately before it, and this extra width increases the height of the step along the remainder of the width of the lower surface. In another embodiment, not shown, the after planing members could also have bottom surfaces which are parallel to and slightly above the strakes 32 and 34 on the hull bottoms 24 and 26.

As can be seen in FIGS. 1 and 2, the after planing members act to enhance the ability of the boat to get on plane. FIG. 1 shows a boat with a minimum length after planing member attempting to get on plane. As can be seen, the water flowing under the hull bottom also hits the after planing member and acts to push up the stern of the boat or push down the bow of the boat. This enhances the clockwise movement of the boat as seen from the side and thus reduces the amount of time needed to get the boat one plane.

As seen in FIG. 2, once the boat is on plane, the aft portion of the hull bottom is riding higher in the water and the boat has a less severe angle with respect to the water. These two factors act to reduce the amount of water impinging on the after planing surface. Thus, the total wetted surface area of the boat is reduced after the boat is on plane, and the after planing surface does not act to severely slow down the boat through the water once the boat has reached plane.

FIG. 3 shows another embodiment of a boat with a longer after planing member and lower surface. However, this member acts similarly to that found in FIGS. 1 and 2. As can be seen in FIG. 3, as the boat is attempting to get onto plane, the water flowing under the hull bottom impinges the after planing surface and acts to push up the stern or push down the bow. Once the boat is on plane, as seen in FIG. 4, most of the bottom surface of the after planing member is not exposed to water, and thus, it does not slow the boat down.

The proper size, location, and shape of the lower surfaces of the after planing members is also an important part of the invention, as these factors will determine the effectiveness with which the after planing members will aid in getting the boat on plane while not interfering with the runability of the boat once it is on plane. It can be appreciated that the ratio of the length of the after planing surface to the length of the boat is an important factor in this consideration. Moreover, the ratio of the width of the after planing surface with respect to the width of the boat at the transom can also be an important factor. Moreover, the ratio of the height of the step of the after planing surface with respect to the length of the after planing surface can also be an important factor.

As seen in FIG. 3, it has been shown to be most effective if the ratio of the length B of the boat from the transom 15 to the bow 11 to the length A of the after planing member or surface is between 7:1 and 16:1. One ratio of B/A which has been found to be most effective is 9:1.

As seen in FIG. 7, it has been found to be effective if the ratio of the width D of the boat at the transom to the width C of the after planing member immediately behind the transom is less than 7:1. One ratio of D/C that has found to be especially effective is 4.4:1. Moreover, as seen in FIGS. 7 and 8, in one embodiment, the width of the after planing members remains substantially constant throughout their length.

As shown in FIG. 9, it has also been found that an effective ratio of the length F of the bottom surfaces 50 and 52 of the after planing members from the transom rearwardly to their distal ends to the height E of the step from the hull bottoms to the bottom surfaces of the after planing members should be between 20:1 and 60:1. One especially effective ratio for F/E has been found to be 45:1.

These ratios have been found to be effective on a boat in which the length B of the main hull section is slightly less than 19 feet and the overall length of the boat, including the after planing members, A+B, is more than 19 feet.

In a third embodiment, as depicted in FIG. 5, the bottom surfaces of the after planing members may actually be canted so that they are tilted slightly downwardly as they project rearwardly from the transom. Thus, if the main boat hull centerline or keel 36 were lying along a horizontal plane the distal end of the bottom surface would be below the portion immediately abaft the transom. Accordingly, even though transverse cross sections of at least a majority of the bottom surfaces of the after planing members are substantially parallel of the bottom surface of the hull, they do not lie a plane parallel to the bottom of the hull, but actually are canted downwardly from the transom rearwardly.

In another embodiment, not shown, this downward attitude of the bottom surface of the after planing member may be a concave surface or it may extend straight and parallel to the hull bottom for some distance behind the transom and then have a downturn at the trailing edge. In a further embodiment, the aft end of the after member may have an adjustable trim tab 90 to further enhance the ability of the boat to get on plane, and this trim tab could retract or tilt upwardly so that it is not in the water as the boat rides while on plane.

In recreational type fiberglass boats in which this invention may be incorporated, it is common to have foam flotation to enhance the buoyancy of the boat if the boat is swamped. The present invention aids in the ability of the boat to float in a level orientation, even if it is swamped, due to the extra foam that can be placed into the interior portion of the after planing members 46 and 48. In addition, as seen in FIGS. 8 and 9, the top portion of the after planing member can be constructed such that one or two steps 60 and 62 can be molded into the top surface to aid in the boarding of the boat from the water.

A boat 100 that is a fourth embodiment of the invention is illustrated in FIGS. 10 through 14. Many features of the boat 100 are similar or substantially identical to features of the above-described boats, and common elements have been given the same reference numerals.

The boat 100 differs in relevant part from the above-described boats in that (see FIG. 14) the raised after planing surfaces 50 and 52 of the boat 100 project aft of the transom 15 and substantially parallel to and stepped slightly above the hull bottom sides 24 and 26 immediately in front of the after planing surfaces 50 and 52, and also project aft generally parallel to and slightly above the chines 38 and 40. Accordingly, each of the after planing surfaces 50 and 52 includes an inner portion 104 angled outwardly and upwardly aft of the immediately forwardly located hull bottom side main portion, and an outer portion 108 slanted outwardly and downwardly aft of the immediately forwardly located chine 38 or 40. As shown in FIG. 14, the bottom surfaces 50 and 52 of the after planing members are, in rear elevation, generally parallel to the main hull bottom at the transom 15 immediately in front of the bottom surfaces 50 and 52.

A boat 200 that is a fourth embodiment of the invention is illustrated in FIGS. 15 through 20. Many features of the boat 200 are similar or substantially identical to features of the above-described boats, and common elements have been given the same reference numerals.

Figure 20:
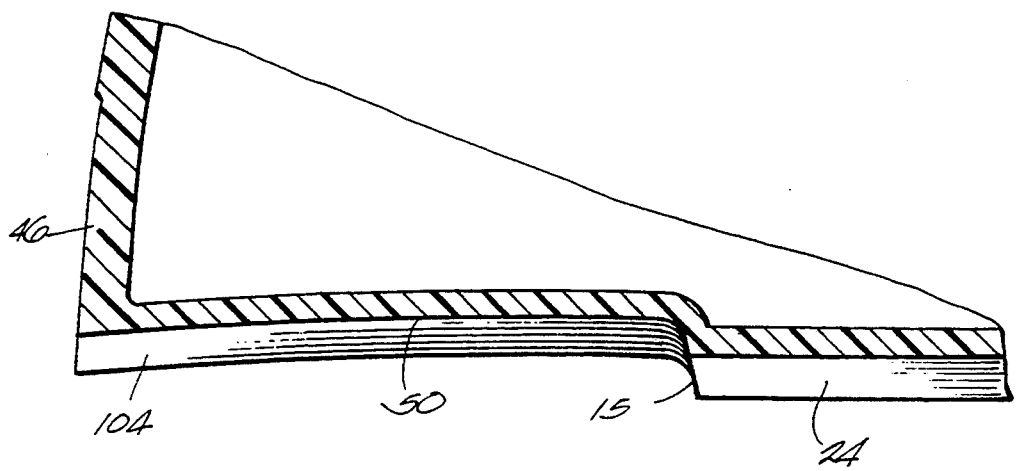
FIG. 20 is a view taken along line 20—20 in FIG. 19.

The boat 200 differs in relevant part from the boat 100 in that the transom includes (see FIG. 18) a central portion 204 which extends generally perpendicular to the longitudinal of the boat 200 axis and which has port and starboard sides 208 and 212, respectively, a port outer portion 216 extending forwardly and outwardly from the port side 208 of the central portion 204, and a starboard outer portion 220 extending forwardly and outwardly from the starboard side 212 of the central portion 204. While the central portion 204 and outer portions 216 and 220 of the transom are shown as being substantially planar, it should be understood that either the outer portions or the entire transom could be curved about a generally vertical axis. The after planing members 46 and 48 project rearwardly of the outer portions 216 and 220 of the transom. Also, referring to FIG. 20, the bottom surface 50 or 52 (only the surface 50 is shown in FIG. 20) of each after planing member curves rearwardly and downwardly from the transom 15 and has a radius of curvature greater than the length of each bottom surface (from left to right in FIG. 20).

Various features of the invention are set forth in the following claims.

We claim:

1. A hull for a boat comprising a longitudinal axis, a main hull bottom having a series of generally "V" shaped transverse cross sections, a substantially vertical transom including a central portion which extends generally perpendicular to said axis and which has port and starboard sides, a port outer portion extending forwardly and outwardly from said port side of said central portion, and a starboard outer portion extending forwardly and outwardly from said starboard side of said central portion, and a pair of after planing members projecting rearwardly of said outer portions of said transom such that said after planing members have bottom surfaces which are in vertically upwardly stepped relation to said main hull bottom immediately in front of said bottom surfaces.

2. A hull as set forth in claim 1 wherein said bottom surfaces are, in rear elevation, generally parallel to said main hull bottom at said transom immediately in front of said bottom surfaces.

3. A hull as set forth in claim 1 wherein said hull includes a pair of hull bottom sides, each side having a first longitudinal inner edge and a second outer edge, with said hull bottom sides connected along said first inner edges and extending transversely upwardly and outwardly therefrom in a generally "V" shaped transverse cross section, each of said hull bottom sides having a main portion angled outwardly and upwardly from said first inner edge, and each of said hull bottom sides having a chine angled outwardly and downwardly from said main portion along a majority of the length of said second edge, and wherein said raised after planing members project aft generally parallel to and slightly above said chines, such that each of said bottom surfaces includes an inner portion angled outwardly and upwardly aft of the immediately forwardly located hull bottom side main portion, and an outer portion slanted outwardly and downwardly aft of the immediately forwardly located chine.

4. A hull as set forth in claim 1 wherein each of said bottom surfaces curves rearwardly and downwardly from said transom.

5. A hull for a boat comprising a main hull bottom having a pair of hull bottom sides, each side having a first longitudinal inner edge and a second outer edge, with said hull bottom sides connected along said first inner edges and extending transversely upwardly and outwardly therefrom in a generally "V" shaped transverse cross section, each of said hull bottom sides having a main portion angled outwardly and upwardly from said first inner edge, and each of said hull bottom sides having a chine angled outwardly and downwardly from said main portion along a majority of the length of said second edge, a substantially vertical transom at the aft ends of said hull bottom sides, and a pair of raised after planing surfaces having forward ends at said transom and projecting aft of said transom and substantially parallel to and stepped slightly above said hull bottom sides immediately in front of said after planing surfaces, and said raised after planing surfaces also projecting aft generally parallel to and slightly above said chines, such that each of said after planing surfaces includes an inner portion angled outwardly and upwardly aft of the immediately forwardly located hull bottom side main portion, and an outer portion slanted outwardly and downwardly aft of the immediately forwardly located chine.

6. A hull as set forth in claim 5 wherein each of said planing surfaces has a length and a radius of curvature greater than said length.

7. A hull for a boat comprising a main hull bottom having a pair of hull bottom sides, each side having a first longitudinal inner edge and a second outer edge, with said hull bottom sides connected along said first inner edges and extending transversely upwardly and outwardly therefrom in a generally "V" shaped transverse cross section, a substantially vertical transom at the aft ends of said hull bottom sides, and a pair of raised after planing surfaces projecting aft of said transom, each of said after planing surfaces including a portion curving rearwardly and downwardly from said transom.

8. A hull as set forth in claim 7 wherein each of said planing surfaces has a length and a radius of curvature greater than said length.

9. A hull for a boat comprising a main hull bottom including a pair of hull bottom sides each having a first longitudinal inner edge, a second outer edge, and a portion inclined to the vertical and located between said inner and outer edges, said hull bottom sides being connected along said first inner edges and extending transversely upwardly and outwardly therefrom in a generally "V" shaped transverse cross section, a substantially vertical transom at the aft ends of said hull bottom sides, and a pair of raised after planing surfaces located adjacent said outer edges, having forward ends at said transom, and projecting aft of said transom in substantially parallel relation to and stepped slightly above said inclined portions of said hull bottom sides, each of said raised after planing surfaces having a length, the step from the main hull bottom to the raised after planing surface having a height, and the ratio of said length to said height being between 20 and 60.

10. The hull of claim 9 wherein said each of said hull bottom sides has a substantially horizontal chine along a majority of the length of said second edges, and said raised after planing surfaces also project rearwardly parallel to and slightly above said chines.

11. The hull of claim 10 wherein each of said bottom sides has a lifting strake extending longitudinally intermediate the first and second edges and said raised after planing surfaces also project rearwardly parallel to and slightly above said strakes.

12. The hull of claim 10 wherein said main hull bottom and each of said raised after planing surfaces have lengths and the ratio of the length of said main hull bottom to the length of one of said raised after planing surfaces is between 7 and 16.

13. The hull of claim 10 wherein said main hull bottom and each of said raised after planing surfaces have lengths and the ratio of the length of said main hull bottom to the length of one of said planing surfaces is 9.

14. The hull of claim 10 wherein said main hull bottom has a width at said transom and each of said raised after planing surfaces has a width immediately behind said transom and the ratio of the width of the hull bottom section at the transom to the width of one of the planing surfaces immediately behind the transom is less than 7.

15. The hull of claim 10 wherein said main hull bottom has a width at said transom and each of the raised after planing surfaces has a width immediately behind said transom and the ratio of the width of said main hull bottom at the transom to the width of one of the planing surfaces immediately behind the transom is 4.4.

16. The hull of claim 10 wherein each of said raised after planing surfaces has a length and the step from the main hull bottom to the raised after planing surface has a height and the ratio of said length of said planing surface to said height of said step is 45.

17. A hull for a boat comprising a main hull bottom having a pair of hull bottom sides, each side having a first longitudinal inner edge and a second outer edge, with said hull bottom sides connected along said first inner edges and extending transversely upwardly and outwardly therefrom in a generally "V" shaped transverse cross section, a substantially vertical transom at the aft ends of said hull bottom sides, and a pair of raised after planing surfaces projecting aft of said transom, said after planing surfaces having a width and a length, with the width of the after planing surfaces being substantially constant throughout the length.

18. A hull for a boat having a stern and a bow comprising a main hull bottom including a pair of inclined portions defining a series of generally "V" shaped transverse cross sections, said main hull bottom having a width at the stern of the boat, a substantially vertical transom extending transversely at the stern, and a pair of after planing members spaced laterally from each other, projecting rearwardly of said transom, and having bottom portions which are in vertically upwardly stepped relation to said main hull bottom immediately in front of said main hull bottom, and which include portions which are, in rear elevation, generally parallel to said inclined portions of said main hull bottom.

19. The hull of claim 18 wherein said cross sections of said main hull have increasingly steep angles from the horizontal as they progress from the stern to the bow.

20. The hull of claim 19 wherein said chines have a width at each cross section and the width of said chines decreases from the stern to the bow.

21. The hull of claim 18 wherein said bottom portions of said after planing members project rearwardly in a plane parallel to and above the plane of the main hull bottom section.

22. The hull of claim 18 wherein said bottom portions of said after planing members project rearwardly and upwardly from a point immediately behind said transom and above said hull bottom section.

23. The hull of claim 18 wherein said bottom portions of said after planing members also comprise an adjustable trim tab at the distal end thereof.

24. The hull of claim 18 wherein the top surface of said after planing members includes at least one step having a substantially horizontal and vertical wall.

25. The hull of claim 18 wherein the after planing members have a length and a width at their bottom portions, and said width of said after planing members does not change along their length.

26. The hull of claim 9 wherein said after planing surfaces project rearwardly in a plane parallel to the plane of said hull bottom sides immediately in front of said after planing surfaces.

27. A hull for a boat comprising a main hull bottom having a pair of hull bottom sides each having a first longitudinal inner edge, a second outer edge, a portion inclined to the vertical and a substantially horizontal chine along a majority of the length of said second edge, said hull bottom sides being connected along said first inner edges and extending transversely upwardly and outwardly therefrom in a generally "V" shaped transverse cross section, a substantially vertical transom at the aft ends of said hull bottom sides, and a pair of raised after planing surfaces having forward ends at said transom, projecting aft of said transom, and including first portions in substantially parallel relation to and stepped slightly above said inclined portions of said hull bottom sides immediately in front of said after planing surfaces, and second portions projecting substantially parallel to and slightly above said said chines immediately in front of said after planing surfaces.

28. A hull for a boat comprising a substantially vertically transom, a main hull bottom extending forwardly from said transom, having a width at said transom, and having a pair of hull bottom sides each having a first longitudinal inner edge, a second outer edge, and a portion inclined to the vertical, said hull bottom sides being connected along said first inner edges and extending transversely upwardly and outwardly therefrom in a generally "V" shaped transverse cross section, and a pair of raised after planing surfaces having forward ends at said transom, projecting aft of said transom in substantially parallel relation to and stepped slightly above said hull bottom sides immediately in front of said after planing surfaces, and, said raised after planing surfaces each having a width immediately behind said transom, and the ratio of the width of said main hull bottom at said transom to the width of one of said after planing surfaces immediately behind said transom being approximately 4.4:1.

29. A hull for a boat comprising a main hull bottom having a length and a pair of hull bottom sides each having a first longitudinal inner edge, a second outer edge, a portion extending longitudinally intermediate said first and second edges and inclined to the vertical, a substantially horizontal chine along a majority of the length of said second edge, and a lifting strake extending longitudinally intermediate said first and second edges, said hull bottom sides being connected along said first inner edges and extending transversely upwardly and outwardly therefrom in a generally "V" shaped transverse cross section, a substantially vertical transom at the aft ends of said hull bottom sides, and a pair of raised after planing surfaces having forward ends at said transom, projecting aft of said transom in substantially parallel relation to and stepped slightly above said inclined portions of said hull bottom sides immediately in front of said after planing surfaces so as to define steps between said after planing surfaces and said hull bottom sides, and including first portions protecting aft parallel to and slightly above said inclined portions, second portions projecting aft parallel to and slightly above said chines, and third portions projecting aft relative to and slightly above said strakes, said raised after planing surfaces each having a length and having a width immediately behind said transom, the ratio of the length of said main hull bottom to the length of one of said after planing surfaces being approximately 9:1, said main hull bottom having a width at said transom, the ratio of the width of said main hull bottom at said transom to the width of one of said after planing surfaces immediately behind the transom being approximately 4.4:1, and each of said steps having a height, and the ratio of the length of one of said planing surfaces to said height of one of said steps being approximately 45:1.

30. A hull for a boat comprising a main hull bottom having first and second hull bottom sides each having an aft portion, a first longitudinal inner edge and a second outer edge, said hull bottom sides being connected along said first inner edges and extending upwardly and outwardly therefrom in a generally "V" shaped transverse cross section, a substantially vertical transom at the aft ends of said hull bottom sides, and first and second after planing surfaces having forward ends at said transom and projecting aft of said transom in respectively upwardly stepped and parallel relation to said aft end portions of said first and second hull bottom sides, whereby said after planing surfaces extend in angled relation to each other, each of said raised after planing surfaces having a length, the step from the main hull bottom to the raised after planing surface having a height, and the ratio of said length to said height being between 20 and 50.

31. The hull of claim 30 wherein said each of said hull bottom sides has a substantially horizontal chine along a majority of the length of said second edges, and said raised after planing surfaces also project rearwardly parallel to and slightly above said chines.

32. The hull of claim 31 wherein each of said bottom sides has a lifting strake extending longitudinally intermediate the first and second edge and said raised after planing surfaces also project rearwardly parallel to and slightly above said strakes.

33. The hull of claim 31 wherein said main hull bottom and each of said raised after planing surfaces have lengths and the ratio of the length of said main hull bottom to the length of one of said raised after planing surfaces is between 7 and 16.

34. The hull of claim 31 wherein said main hull bottom and each of said raised after planing surfaces have lengths and the ratio of the length of said main hull bottom to the length of one of said planing surfaces is 9.

35. The hull of claim 31 wherein said main hull bottom has a width at said transom and each of said raised after planing surfaces has a width immediately behind said transom and the ratio of the width of the hull bottom section at the transom to the width of one of the planing surfaces immediately behind the transom is less than 7.

36. The hull of claim 31 wherein said main hull bottom has a width at said transom and each of the raised after planing surfaces has a width immediately behind said transom and the ratio of the width of said main hull bottom at the transom to the width of one of the planing surfaces immediately behind the transom is 4.4.

37. The hull of claim 31 wherein each of said raised after planing surfaces has a length and the step from the main hull bottom to the raised after planing surface has a height and the ratio of said length of said after planing surface to said height of said step is between 20 and 50.

38. The hull of claim 31 wherein each of said raised after planing surfaces has a length and the step from the main hull bottom to the raised after planing surface has a height and the ratio of said length of said after planing surface to said height of said step is 45.

39. The hull of claim 30 wherein said after planing surfaces project rearwardly in a plane parallel to the plane of said hull bottom sides immediately in front of said after planing surfaces.

40. A hull for a boat comprising a main hull bottom having a pair of hull bottom sides, each of said hull bottom sides having an aft end, an aft end portion extending forwardly from said aft end, a first longitudinal inner edge, a second outer edge, said hull bottom sides being connected to each other along said first inner edges and extending transversely upwardly and outwardly therefrom in a generally "V" shaped transverse cross section, and a substantially horizontal chine extending along a majority of the length of each of said second edges and respectively including aft end portions, a substantially vertical transom at said aft ends of said hull bottom sides, and a pair of after planing surfaces having forward ends at said transom and respectively including first portions projecting aft of said transom in substantially parallel and upwardly stepped relation to said aft end portions of said hull bottom sides, and second portions located outwardly of said first portions in substantially parallel and upwardly stepped relation to said aft end portions of said chines.

41. A hull for a boat comprising a substantially vertical transom, a main bottom extending forwardly from said transom, having a width at said transom, and including a pair of hull bottom sides each having an aft end, a first longitudinal inner edge, and a second outer edge, said inner edges being connected to each other to define a keel and said hull bottom sides extending transversely upwardly and outwardly therefrom in a generally "V" shaped transverse cross section, and a pair of after planing surfaces located in laterally spaced relation to said keel, said after planing surfaces also being laterally spaced from each other by a portion of said transom, having forward ends at said transom, projecting aft of said transom, being substantially parallel to and stepped above said aft ends of said hull bottom sides, and having a width immediately behind said transom, the ratio of the width of said main hull bottom at said transom to the width of one of said after planing surfaces immediately behind said transom being approximately 4.4.

42. A hull for a boat comprising a main hull bottom having a length and a pair of hull bottom sides, each side having a first longitudinal inner edge and a second outer edge, with said hull bottom sides connected along said first inner edges and extending transversely upwardly and outwardly therefrom in a generally "V" shaped transverse cross section, each of said hull bottom sides having a substantially horizontal chine along a majority of the length of said second edge, and each of said bottom sides also having a lifting strake extending longitudinally intermediate said first and second edges, a substantially vertical transom at the aft ends of said hull bottom sides, and a pair of raised after planing surfaces having forward ends at said transom and projecting aft of said transom and substantially parallel to and stepped slightly above said hull bottom sides immediately in front of said after planing surfaces so as to define steps between said after planing surfaces and said hull bottom sides, said raised after planing surfaces also projecting aft parallel to and slightly above said chines, and said raised after planing surfaces also projecting aft relative to and slightly above said strakes, and each of said raised after planing surfaces having a length and having a width immediately behind said transom, the ratio of the length of said main hull bottom to the length of one of said after planing surfaces being approximately 9, and said main hull bottom having a width at said transom, the ratio of the width of said main hull bottom at said transom to the width of one of said after planing surfaces immediately behind the transom being approximately 4.4, and each of said steps having a height and the ratio of the length of one of said planing surfaces to said height of one of said steps being approximately 45.

* * * * *